United States Patent
Yang et al.

(10) Patent No.: US 10,467,195 B2
(45) Date of Patent: Nov. 5, 2019

(54) ADAPTIVE CACHING REPLACEMENT MANAGER WITH DYNAMIC UPDATING GRANULATES AND PARTITIONS FOR SHARED FLASH-BASED STORAGE SYSTEM

(71) Applicant: Samsung Electronics Co., Ltd., Suwon-si, Gyeonggi-do (KR)

(72) Inventors: Zhengyu Yang, Boston, MA (US); Thomas David Evans, San Marcos, CA (US); Jiayin Wang, Dorchester, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 15/400,835

(22) Filed: Jan. 6, 2017

(65) Prior Publication Data

US 2018/0067961 A1 Mar. 8, 2018

Related U.S. Application Data

(60) Provisional application No. 62/384,078, filed on Sep. 6, 2016.

(51) Int. Cl.
*G06F 9/455* (2018.01)
*G06F 16/172* (2019.01)
(Continued)

(52) U.S. Cl.
CPC ............ *G06F 16/172* (2019.01); *G06F 3/06* (2013.01); *G06F 3/061* (2013.01); *G06F 3/0634* (2013.01); *G06F 3/0685* (2013.01); *G06F 9/45558* (2013.01); *G06F 12/0808* (2013.01); *G06F 12/0811* (2013.01); *G06F 12/0842* (2013.01); *G06F 12/0862* (2013.01);
(Continued)

(58) Field of Classification Search
None
See application file for complete search history.

(56) References Cited

U.S. PATENT DOCUMENTS 5,627,990 A   5/1997   Cord et al.
5,768,594 A   6/1998   Blelloch et al.
(Continued)

FOREIGN PATENT DOCUMENTS

CN   103955436 A   7/2014
CN   102467452 B   8/2014
(Continued)

OTHER PUBLICATIONS

Chiang et al, An Adaptive IO Prefetching Approach for Virtualized Data Centers, IEEE 2015, 14 pages.*
(Continued)

*Primary Examiner* — Diem K Cao
(74) *Attorney, Agent, or Firm* — Lewis Roca Rothgerber Christie LLP

(57) ABSTRACT

A method of adjusting temporal and spatial granularities associated with operation of a virtualized file system, the method including analyzing past workloads of a plurality of virtual machines associated with the virtualized file system, and adjusting the temporal and spatial granularities to be similar to average re-access temporal and spatial distances of data sets corresponding to the past workloads.

16 Claims, 10 Drawing Sheets

(51) Int. Cl.

| | | |
|---|---|---|
| *G06F 16/188* | (2019.01) | |
| *G06F 12/0862* | (2016.01) | |
| *G06F 12/123* | (2016.01) | |
| *G06F 12/0808* | (2016.01) | |
| *G06F 12/0842* | (2016.01) | |
| *G06F 12/126* | (2016.01) | |
| *G06F 12/0811* | (2016.01) | |
| *G06F 3/06* | (2006.01) | |
| *G06F 12/0868* | (2016.01) | |

(52) U.S. Cl.
CPC ......... *G06F 12/124* (2013.01); *G06F 12/126* (2013.01); *G06F 16/188* (2019.01); *G06F 12/0868* (2013.01); *G06F 2009/4557* (2013.01); *G06F 2009/45579* (2013.01); *G06F 2009/45583* (2013.01); *G06F 2212/1021* (2013.01); *G06F 2212/602* (2013.01); *G06F 2212/6024* (2013.01); *G06F 2212/62* (2013.01)

(56) References Cited

U.S. PATENT DOCUMENTS

| | | | |
|---|---|---|---|
| 6,519,756 B1 | 2/2003 | Kao et al. | |
| 6,553,394 B1 | 4/2003 | Perry et al. | |
| 6,609,088 B1 | 8/2003 | Wuytack et al. | |
| 7,076,640 B2 | 7/2006 | Kadambi | |
| 7,194,587 B2 | 3/2007 | McCalpin et al. | |
| 8,140,751 B1* | 3/2012 | Wang | G06F 3/0625 711/114 |
| 8,190,595 B2 | 5/2012 | Bruno et al. | |
| 8,417,872 B2 | 4/2013 | Bae et al. | |
| 8,463,825 B1 | 6/2013 | Harty et al. | |
| 8,495,178 B1 | 7/2013 | Jia et al. | |
| 8,874,848 B2 | 10/2014 | Soundararajan et al. | |
| 8,918,362 B2 | 12/2014 | Calder et al. | |
| 8,924,978 B2 | 12/2014 | Meng et al. | |
| 8,953,602 B2 | 2/2015 | Yang et al. | |
| 8,959,519 B2 | 2/2015 | Agarwal et al. | |
| 8,959,524 B2 | 2/2015 | Hirsch et al. | |
| 9,002,939 B2 | 4/2015 | Laden et al. | |
| 9,053,167 B1 | 6/2015 | Swift et al. | |
| 9,116,913 B2 | 8/2015 | Fukatani et al. | |
| 9,182,927 B2 | 11/2015 | Liu et al. | |
| 9,189,410 B2 | 11/2015 | Luo et al. | |
| 9,201,891 B2 | 12/2015 | Romanski et al. | |
| 9,213,721 B1 | 12/2015 | Faibish et al. | |
| 9,256,374 B1 | 2/2016 | Aron et al. | |
| 9,280,300 B2 | 3/2016 | Liu et al. | |
| 9,304,997 B2 | 4/2016 | Beard et al. | |
| 9,323,462 B2 | 4/2016 | Olson et al. | |
| 9,330,108 B2 | 5/2016 | Jones et al. | |
| 9,342,390 B2 | 5/2016 | Chen et al. | |
| 9,348,707 B2 | 5/2016 | Kashyap et al. | |
| 9,372,630 B2 | 6/2016 | Guo et al. | |
| 9,513,814 B1 | 12/2016 | Can et al. | |
| 9,817,766 B1 | 11/2017 | Si et al. | |
| 10,048,996 B1 | 8/2018 | Bell et al. | |
| 2002/0035605 A1 | 3/2002 | McDowell et al. | |
| 2003/0109940 A1 | 6/2003 | Guntzer et al. | |
| 2004/0193952 A1 | 9/2004 | Narayanan et al. | |
| 2005/0010629 A1 | 1/2005 | Hess et al. | |
| 2005/0086384 A1 | 4/2005 | Ernst | |
| 2006/0026154 A1 | 2/2006 | Altinel et al. | |
| 2006/0253674 A1* | 11/2006 | Zohar | G06F 11/0727 711/165 |
| 2007/0033659 A1 | 2/2007 | Hoche et al. | |
| 2008/0126547 A1* | 5/2008 | Waldspurger | G06F 9/4881 709/226 |
| 2009/0049421 A1 | 2/2009 | Meijer et al. | |
| 2009/0276657 A1 | 11/2009 | Wetmore et al. | |
| 2009/0288084 A1* | 11/2009 | Astete | G06F 9/45533 718/1 |
| 2010/0281078 A1 | 11/2010 | Wang et al. | |
| 2011/0035548 A1 | 2/2011 | Kimmel et al. | |
| 2011/0302371 A1 | 12/2011 | Lysko | |
| 2012/0268471 A1 | 10/2012 | Khalvati et al. | |
| 2013/0055290 A1 | 2/2013 | Gaikwad et al. | |
| 2013/0073523 A1 | 3/2013 | Gounares et al. | |
| 2013/0074057 A1 | 3/2013 | Gounares et al. | |
| 2013/0124916 A1 | 5/2013 | Shutt et al. | |
| 2013/0179630 A1* | 7/2013 | Yano | G06F 12/0246 711/103 |
| 2013/0232382 A1 | 9/2013 | Jain et al. | |
| 2013/0290249 A1 | 10/2013 | Merriman et al. | |
| 2013/0297902 A1* | 11/2013 | Collins | G06F 3/0605 711/163 |
| 2014/0149637 A1 | 5/2014 | Gu et al. | |
| 2014/0164687 A1 | 6/2014 | Kwon et al. | |
| 2014/0207955 A1 | 7/2014 | Musial et al. | |
| 2014/0324785 A1 | 10/2014 | Gupta et al. | |
| 2015/0006788 A1 | 1/2015 | Liu et al. | |
| 2015/0074350 A1 | 3/2015 | Chiang et al. | |
| 2015/0127646 A1 | 5/2015 | Shaw | |
| 2015/0188840 A1* | 7/2015 | Xiao | G06F 9/50 709/226 |
| 2015/0234617 A1 | 8/2015 | Li et al. | |
| 2015/0234719 A1 | 8/2015 | Coronado et al. | |
| 2015/0254322 A1 | 9/2015 | Ma et al. | |
| 2015/0288669 A1 | 10/2015 | Litoiu et al. | |
| 2015/0333994 A1 | 11/2015 | Gell et al. | |
| 2015/0347451 A1 | 12/2015 | Lee et al. | |
| 2016/0011876 A1 | 1/2016 | Mukherjee et al. | |
| 2016/0019286 A1 | 1/2016 | Bach et al. | |
| 2016/0132433 A1 | 5/2016 | Hayashi et al. | |
| 2016/0170882 A1 | 6/2016 | Choi et al. | |
| 2016/0188490 A1 | 6/2016 | Samih | |
| 2016/0188898 A1* | 6/2016 | Karinta | G06F 17/30221 726/4 |
| 2016/0291942 A1 | 10/2016 | Hutchison | |
| 2016/0292053 A1 | 10/2016 | Antony et al. | |
| 2017/0134337 A1 | 5/2017 | Araújo | |
| 2017/0142217 A1 | 5/2017 | Misra et al. | |
| 2017/0242958 A1 | 8/2017 | Brown | |
| 2017/0244784 A1* | 8/2017 | Lam | H04L 67/1008 |
| 2017/0318091 A1* | 11/2017 | Ke | H04L 41/5054 |
| 2018/0025092 A1 | 1/2018 | Aharonov et al. | |
| 2018/0048712 A1* | 2/2018 | Sarisky | H04L 67/1097 |
| 2018/0060237 A1 | 3/2018 | Leslie-Hurd et al. | |

FOREIGN PATENT DOCUMENTS

| | | |
|---|---|---|
| JP | 5478526 B2 | 4/2014 |
| WO | WO 2013/024952 A1 | 2/2013 |

OTHER PUBLICATIONS

Meng et al, vCacheShare: Automated Server Flash Cache Space Management in a Virtualization Environment, North Carolina State University, 2014, pp. 1-12.*

Luo, Tian et al., "S-CAVE: Effective SSD Caching to Improve Virtual Machine Storage Performance", Proceeding, PACT '13 Proceedings of the 22nd international conference on Parallel architectures and compilation techniques, pp. 103-112, Edinburg, Scotland, UK, Oct. 7, 2013, (10 pages).

Ren, Jen, "I-CASH: Intelligently Coupled Array of SSD and HDD", Dept. of Electrical, Computer and Biomedical Engineering, University of Rhode Island, Kingston, RI 02881 (12 pages).

Rajasekaran, Sundaresan, "Multi-Cache: Dynamic, Efficient Partitioning for Multi-Tier Caches in Consolidated VM Environments", Department of Computer Science, The George Washington University, (10 pages).

Liu, Yi et al., "SSD as a Cloud Cache? Carefully Design about It", Shenzhen Institutes of Advanced Technology, Chinese Academy of Sciences, Shenzhen 518055, P.R. China; Department of Computer Science, University of Minnesota, Twin Cities, USA; Shenzhen College of Advanced Technology, University of Chinese Academy of Sciences, Shenzhen 518055, P.R. China, Journal of Computers, vol. 27, No. 1, Apr. 2015 (pp. 26-37).

Bocchino Parallel Programming Must Be Deterministic by Default U of Illinois 2009 (Year: 2009).

(56) References Cited

OTHER PUBLICATIONS

Etheredge Pure and Deterministic Functions (Year: 2008).
Hellerstein Query Execution Techniques for Caching Expensive Methods 1996 (Year: 1996).
Kanninnura A Speed-up Technique for an Auto Memoization Processor by Reusing Partial Results of Instruction Regions (Year: 2012).
Kathpal Analyzing Compute vs. Storage Tradeoff for Video aware Storage Efficiency (Year: 2012).
Khanafer The Constrained Ski-Rental Problem and its Application to Online Cloud Cost Optimization (Year: 2013).
Ma Way Memoization to Reduce Fetch Energy in Instruction Caches MIT 2001 (Year: 2001).
Mayfield Using Automatic Memoization as a Software Engineering Tool in Real World AI Systems (Year: 1995).
Spark Trademark Evidence (Year: 2018).
Toffola Performance Problems You Can Fix A Dynamic Analysis of Memoization Opportunities 2015 (Year: 2015).
Ziarek Partial Memoization of Concurrency and Communication (Year: 2009).
U.S. Office Action dated Apr. 11, 2018, issued in U.S. Appl. No. 15/404,100 (24 pages).
U.S. Office Action dated Apr. 11, 2018, issued in U.S. Appl. No. 15/404,121 (31 pages).
U.S. Office Action dated Apr. 19, 2018, issued in U.S. Appl. No. 15/423,384 (20 pages).
Apache Sparks: "core concepts, architecture and internals," http://datastrophic.io/core-concepts-architecture-and-internals-of-apache-spark/, Mar. 3, 2016 on Spark (17 pages).
Bu et al., "HaLoop: Efficient Iterative Data Processing on Large Clusters", Proc. of the VLDB, vol. 3, No. 1-2, DOI: 10.14778/1920841.1920881, Sep. 30, 2010, pp. 285-296.
Dean, Jeffrey et al., "MapReduce: Simplified Data Processing on Large Clusters", Communications of the ACM, Jan. 2008, vol. 51, No. 1 (pp. 107-113).
Ding, Chen, et al., "Predicting Whole-Program Locality through Reuse Distance Analysis," SIGPLAN Notices, 2003, pp. 245-257.
Liu, Deng, et al., "VFRM: Flash Resource Manager in VMware ESX Server," IEEE Network Operations and Management Symposium (NOMS), 2014, 7 pages.
Meng, Fei, et al., "vCacheShare: Automated Server Flash Cache Space Management in a Virtualization Environment," USENIX Annual Technical Conference, 2014, pp. 133-144.

"Spark Programming Guide," *Apache Spark 2.1.0.*, https://spark.apache.org/docs/latest/programming-guide.html#rdd-operations.
Tai, Jianzhe, et al., "Improving Flash Resource Utilization at Minimal Management Cost in Virtualized Flash-based Storage Systems," IEEE Transactions on Cloud Computing, 2015, 15 pages.
Venugopal, et al., A Taxonomy of Data Grids for Distributed Data Sharing, Management and Processing, ACM CSUR, vol. 38, No. 1, DOI: 10.1145/1132952.1132955, Jun. 29, 2006, pp. 1-46.
Wang et al., "A New Scheme for Cache Optimization Based on Cluster Computing Framework Spark", 2015 8th International Symposium on Computational Intelligence and Design (ISCID). vol. 1. IEEE, 2015, pp. 114-117.
Zaharia, Matei et al., "Spark: Cluster Computing with Working Sets", University of California, Berkeley, HotCloud 10 (2010): 10-10, (pp. 1-7).
Xu, Zhou, et al. "A Dynamic Distributed Replica Management Mechanism Based on Accessing Frequency Detecting," Operating Systems Review (ACM), vol. 38, No. 3, 2004, pp. 26-34; DOI: 10.1145/1035834.1035838.
Lecture 18: Dynamic Programming I: Memoization, Fibonacci, Crazy Eights; MIT, Dept of Computer Science and AI; Fall 2009; Available at http://courses.csail.nnitedu/6.006/fal109/lecture notes/lecture18.pdf (Year: 2009).
Intercepting Functions for Memoization: A Case Study Using Transcendental Functions by Suresh (Year: 2015).
U.S. Office Action dated Oct. 17, 2018, issued in U.S. Appl. No. 15/408,328 (10 pages).
U.S. Advisory Action dated Oct. 29, 2018, issued in U.S. Appl. No. 15/404,100 (8 pages).
A Stochastic Memoizer for Sequence Data by Wood; International Conference on Machine Learning, Montreal, Canada, 2009. Year: 2009).
U.S. Notice of Allowance dated Dec. 31, 2018, issued in U.S. Appl. No. 15/404,100 (12 pages).
Rajasekaran, Sundaresan, "Multi-Cache: Dynamic, Efficient Partitioning for Multi-Tier Caches in Consolidated VM Environments", IEEE International Conference on Cloud Engineering, 2016, Date Added to IEEE Xplore: Jun. 2, 2016, (10 pages).
Ren, Jen, "I-CASH: Intelligently Coupled Array of SSD and HDD", IEEE 17th International Symposium on High Performance Computer Architecture, 2011, Date Added to IEEE Xplore: Apr. 15, 2011, (12 pages).
"Spark Programming Guide," *Apache Spark, Version 2.1.0.*, Released on Dec. 2016, https://spark.apache.org/docs/latest/programming-guide.html#rdd-operations.

\* cited by examiner

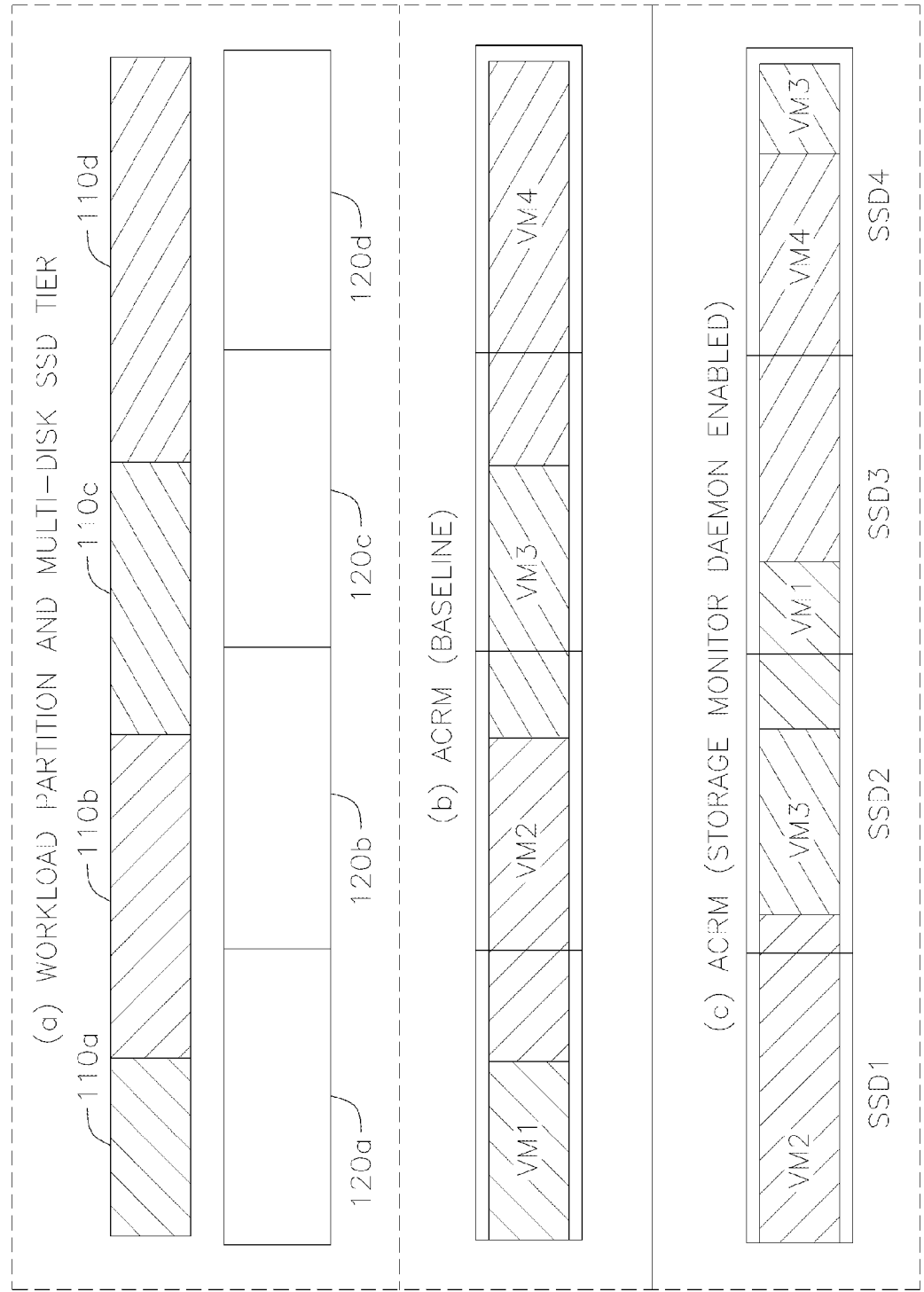

ADAPTIVE CACHING REPLACEMENT MANAGER WITH DYNAMIC UPDATING GRANULATES AND PARTITIONS FOR SHARED FLASH-BASED STORAGE SYSTEM

CROSS-REFERENCE TO RELATED APPLICATION(S)

This application claims priority to, and the benefit of, U.S. Provisional Application 62/384,078 filed on Sep. 6, 2016, the entire content of which is incorporated herein by reference.

FIELD

One or more aspects of embodiments according to the present invention generally relate to a system and method for improving disk allocation in a virtualized file system.

BACKGROUND

In a shared virtualized storage system that runs virtual machines (VMs) on physical servers with varying/heterogeneous input/output (IO) demands, it may be difficult for a hypervisor host to cost-effectively partition and allocate resources of a solid-state drive (SSD) among multiple VMs. For example, an IO hit ratio corresponding to the SSD, when used as a cache for a hard disk drive (HDD) storage pool, may be unacceptably low, and SSD-HDD updating IO costs may be unacceptably high.

Additionally, conventional technologies may assume that a distribution of IO popularity is relatively static, and that the IO popularity, therefore, does not vary significantly over time. Accordingly, conventional technologies may also assume that simply using a lazy, asynchronous approach for SSD-HDD updating is sufficient for keeping operational cost low.

The approach of conventional technologies is to fix spatial granularities (e.g., 1 MB as a size of migration units for updating placement of data blocks between SSD and HDD), and to also fix temporal IO-updating granularities (e.g., a time period of five minutes as an update period). Fixing the temporal and spatial granularities, however, unfortunately cannot fully utilize the benefits of SSD resources when workloads of the VMs frequently change, or when bursty IOs/IO requests occasionally occur in the virtualized file system.

SUMMARY

Aspects of embodiments of the present disclosure are directed toward a system and method for improving disk allocation in a virtualized file system.

According to an embodiment of the present invention, there is provided a method of adjusting temporal and spatial granularities associated with operation of a virtualized file system, the method including analyzing past workloads of a plurality of virtual machines associated with the virtualized file system, and adjusting the temporal and spatial granularities to be similar to average re-access temporal and spatial distances of data sets corresponding to the past workloads.

The method may further include adjusting partition sizes inside a fast drive of the virtualized file system for each virtual machine disk of the virtual machines.

The method may further include detecting IO changes of each virtual machine disk, and wherein adjusting partition sizes is based on the detected IO changes.

Adjusting the temporal and spatial granularities may include adjusting a time interval of a workload monitor sliding window for updating content of a fast drive used as a cache of the virtualized file system.

The analyzing past workloads of the plurality of virtual machines may occur at an end of the workload monitor sliding window.

Adjusting the temporal and spatial granularities may include adjusting a prefetching bin size corresponding to an amount of data retrieved from a fast drive or a slow drive of the virtualized file system.

Adjusting the temporal and spatial granularities may include adjusting a cache size or an epoch updating frequency of each of the virtual machines based on the past workloads.

The method may further include updating a fast drive as a cache of the virtualized file system by prefetching data in a most recent epoch based on the adjusted temporal and spatial granularities.

The method may further include conducting load balancing, wear leveling, disk health monitoring, and disk retirement/replacement based on the past workloads.

The method may further include separating the virtual machines into sub-partitions, and assigning the sub-partitions across a plurality of fast drives of an array to balance wear of the fast drives.

According to an embodiment of the present invention, there is provided a virtualized file system, including a plurality of virtual machines, one or more slow drives, a fast drive as a cache for the one or more slow drives, a memory, and a processor coupled to the memory, the processor executing a software component that is configured to analyze past workloads of a plurality of virtual machines associated with the virtualized file system, and adjust temporal and spatial granularities to be similar to average re-access temporal and spatial distances of data sets corresponding to the past workloads.

The software component may be further configured to adjust partition sizes inside the fast drive for each virtual machine disk of the virtual machines.

The software component may be further configured to detect IO changes of each virtual machine disk, and wherein the software component is configured to adjust the partition sizes based on detected IO changes.

The software component may be configured to adjust the temporal and spatial granularities by adjusting a time interval of a workload monitor sliding window for updating content of a fast drive used as a cache of the virtualized file system.

The software component may be configured to adjust the temporal and spatial granularities by adjusting a prefetching bin size corresponding to an amount of data retrieved from a fast drive or a slow drive of the virtualized file system.

The software component may be configured to adjust the temporal and spatial granularities by adjusting a cache size or an epoch updating frequency of each of the virtual machines based on the past workloads.

The virtualized file system may further include updating a fast drive as a cache of the virtualized file system by prefetching data in a most recent epoch based on the adjusted temporal and spatial granularities.

The software component may be further configured to conduct load balancing, wear leveling, disk health monitoring, and disk retirement/replacement based on the past workloads.

The software component may be further configured to separate the virtual machines into sub-partitions, and assign the sub-partitions across a plurality of fast drives of an array to balance wear of the fast drives.

According to an embodiment of the present invention, there is provided a method of adjusting temporal and spatial granularities associated with operation of a virtualized file system, the method including determining whether an end of a workload monitor sliding window corresponding to a plurality of virtual machines of the virtualized file system is reached, updating one or more of a prefetching granularity, a cache size, and an update frequency of a content update epoch sliding window for each of the virtual machines, determining whether an end of the content update epoch sliding window of a corresponding one of the virtual machines is reached, and updating content of the corresponding one of the virtual machines.

BRIEF DESCRIPTION OF THE DRAWINGS

These and other aspects of embodiments of the present invention will be appreciated and understood with reference to the specification, claims, and appended drawings wherein:

FIG. 10 depicts a comparison of content update and wear leveling processes using both an ACRM that is storage monitor daemon-enabled and an ACRM that has no storage monitor daemon, according to embodiments of the present invention.

DETAILED DESCRIPTION

Figure 1:
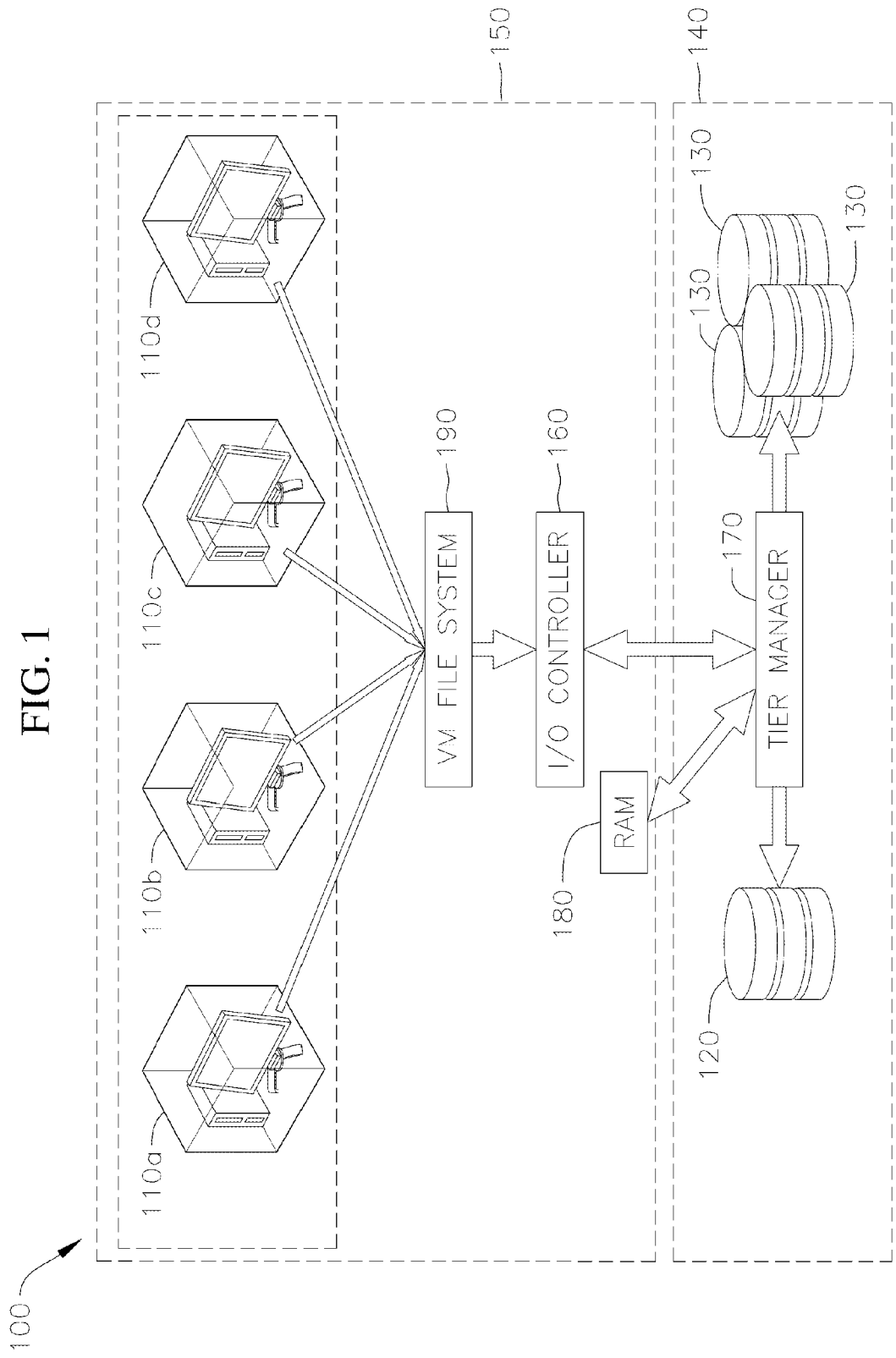
FIG. 1 is a block diagram of a system architecture of an adaptive caching replacement manager (ACRM) virtual machine-shared storage system, according to an embodiment of the present invention.

Aspects of embodiments of the present disclosure are directed toward a system and method for improving disk allocation in a virtualized file system by dynamically adjusting temporal and spatial granularities associated with IO requests.

Features of the inventive concept and methods of accomplishing the same may be understood more readily by reference to the following detailed description of embodiments and the accompanying drawings. Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. In addition, it will also be understood that when an element or layer is referred to as being "between" two elements or layers, it can be the only element or layer between the two elements or layers, or one or more intervening elements or layers may also be present.

In the following examples, the x-axis, the y-axis and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the described embodiments.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram of a system architecture of an adaptive caching replacement manager (ACRM) virtual machine-shared storage system, according to an embodiment of the present invention.

Referring to FIG. 1, virtualized file systems operate as a basic supporting infrastructure in commercial cloud computing environments. In such virtualized file systems, multiple virtual machines (VMs) 110 that run on physical servers often share storage services with each other, while each VM 110 has its own workload pattern and caching requirement. Thus, one or more fast memory drives (e.g., flash-based solid state drives (SSDs)) 120 may be deployed as a per-virtual machine disk (per-VMDK) second-level cache for one or more slow memory drives (e.g., hard disk drives (HDDs)) 130 of a storage pool 140 in a virtualized file system 100 to improve IO access performance, and to achieve low power consumption (e.g., by increasing IO throughput, and by reducing IO latency).

It should be noted that "fast" and "slow," as used herein with respect to memory devices, are intended as relative terms for describing overall speed of different drive technologies used within the virtualized file system 100. Accordingly, although SSDs and the HDDs may be used to describe the virtualized file system 100, any pair of different forms of storage, regardless of the technology used, where one storage device is relatively or markedly faster than the other may be used in conjunction with the embodiments of the present invention described below.

The virtualized file system 100 may include a hypervisor host level 150, which includes four virtual machines (VMs) 110a-110d running on one or more physical servers. Each of the VMs 110 share access to a storage pool level 140, which includes the one or more slow memory drives/HDDs 130, as well as one or more fast memory drives/SSDs 120 used as a cache for the HDDs 130 of the storage pool 140. The VMs 110 run on the hypervisor host level 150, and an IO controller 160 optimizes and dispatches IOs/IO requests to the storage pool 140 via a tier manager 170. A random access memory (RAM) 180 at the hypervisor host level 150 may store and bookkeep the logical and physical addresses associated with the IOs, which may be received from the tier manager 170.

As mentioned above, in conventional virtualized file systems, it may be difficult for the hypervisor host 150 to cost-effectively partition and allocate resources of the SSD 120 among multiple VMs 110 having varying IO demands using a shared VM file system 190. This may be due to the fact that traditional caching algorithms are not suitable for such a VM environment.

For example, a granularity of an update of a fast drive-slow drive update scheme (e.g., SSD-HDD update scheme), which is conventionally fixed, may be very small, or fine-grained, such that each IO request requires a lookup of the SSD 120 to determine whether information corresponding to the IO request is already in the SSD 120 that is used as cache. Thereafter, the tier manager 170 will pull the information found in the SSD 120 to deliver the information for storage in one or more of the HDDs 130 of the storage pool 140. Furthermore, sometimes information received from one or more of the VMs 110 need not be cached in the SSD 120. These inherent results associated with traditional caching algorithms may result in underperformance of the virtualized file system.

Additionally, it may appear that distribution of IO popularity does not generally vary significantly over time, thus a lazy and asynchronous SSD-HDD updating approach should be sufficient for reducing or minimizing operational cost. However, by using fixed spatial and temporal granularities (e.g., by using 1 MB as migration units to update the placement of data blocks between the SSD 120 and the HDDs 130, and by using 5 minutes as an update period) full utilization of the benefits of SSD resources may result when workloads of the VMs frequently change, and when bursty IOs occasionally occur.

Accordingly, embodiments of the present invention provide a new system and method, which may be referred to generally as an adaptive caching replacement manager (ACRM), to solve two major problems associated with SSD allocation for a shared-VM system. These two problems are low IO hit ratio and high SSD-HDD updating IO costs. The ACRM solves these problems by providing a smart SSD-HDD update scheme that, unlike conventional systems, is able to modify temporal granularities and spatial granularities associated with operation of the virtualized file system 100. This may be done by matching the SSD-HDD update granularities to be close to the average re-access temporal and spatial distances of a majority of accessed data sets of the recent workloads. The ACRM, is transparent to VM users, is also able to use a per-VM dynamical partition optimization framework that is able to adaptively adjust partition sizes for each VM disk (VMDK) inside the SSD 120 based on IO changes of each VMDK, thereby fully utilizing SSD resources as a second level cache. Accordingly, the ACRM is able to improve the IO hit ratio in the SSD 120, and reduce the SSD-HDD updating IO costs.

The ACRM of the present embodiment does not update the fast and slow drives (e.g., the SSD 120 and the HDDs 130) as frequently as systems associated with traditional caching algorithms. Instead, the ACRM follows what may be referred to as "course granularity" in both temporal and spatial levels. For example, in the temporal level, the ACRM may adjust a time interval for updating the content of the SSD 120 (i.e., may adjust content update frequencies). In the spatial level, the ACRM may adjust a prefetch size/prefetching bin size corresponding to an amount of data retrieved from the SSD 120 or the HDDs 130 of the storage pool 140. The ACRM may make these adjustments during runtime based on changes in workload for each VM 110.

Further, the ACRM may develop a strategy for adjusting operating procedures of the virtualized file system 100 by using advanced mathematics such that an optimization framework of the ACRM can provide a global best solution for the temporal and spatial granularities, while also accounting for a per-VM partition size to adaptively find the best solution for per-VM partition in the shared SSD(s) 120, as will be described below with respect to FIG. 10. The optimization framework of the ACRM may run in the tier manager 170, which monitors the workload changes of the VMs 110, and which decides to update a destination of each of the IOs, and to also update prefetching operations from the HDDs 130 to the SSD 120 to improve the IO hit ratio.

By using multiple types of sliding windows and granularities that are suitable for different purposes, the ACRM can switch between lazy and aggressive update modes and prefetching modes to thereby increase accuracy of workload pattern detections, and can also increase efficiency of dynamic cache configuration calibration. Further, by leveraging feedback corresponding to IO patterns of workloads, estimated cache performance, and estimated gains and costs of SSD-HDD prefetching, the optimization framework provided by the ACRM can make accurate decisions with regard to resource allocation, and is thereby able to obtain a high IO hit ratio with low IO management costs. Furthermore, the optimization framework provided by the ACRM can increase a maximum number of supported VMs 110 running on the given hardware resource of the virtualized file system 100.

It should be noted that, although the storage pool 140 indicates the use of the SSD 120 and the HDDs 130, the ACRM is compatible with a two-tier storage architecture using any type(s) of storage devices. For example, the ACRM can support PCIe or NVMe SSDs (including an array of independent disks (RAID)) as a cache tier of the two-tier storage, and can support the spinning HDDs (including RAID) as the disk tier of the two-tier storage. Additionally, the ACRM may have a storage monitor daemon to further conduct load balancing, wear leveling, disk health monitoring, and disk retirement/replacement operations, as will be described below with respect to FIG. 9.

Figure 2:
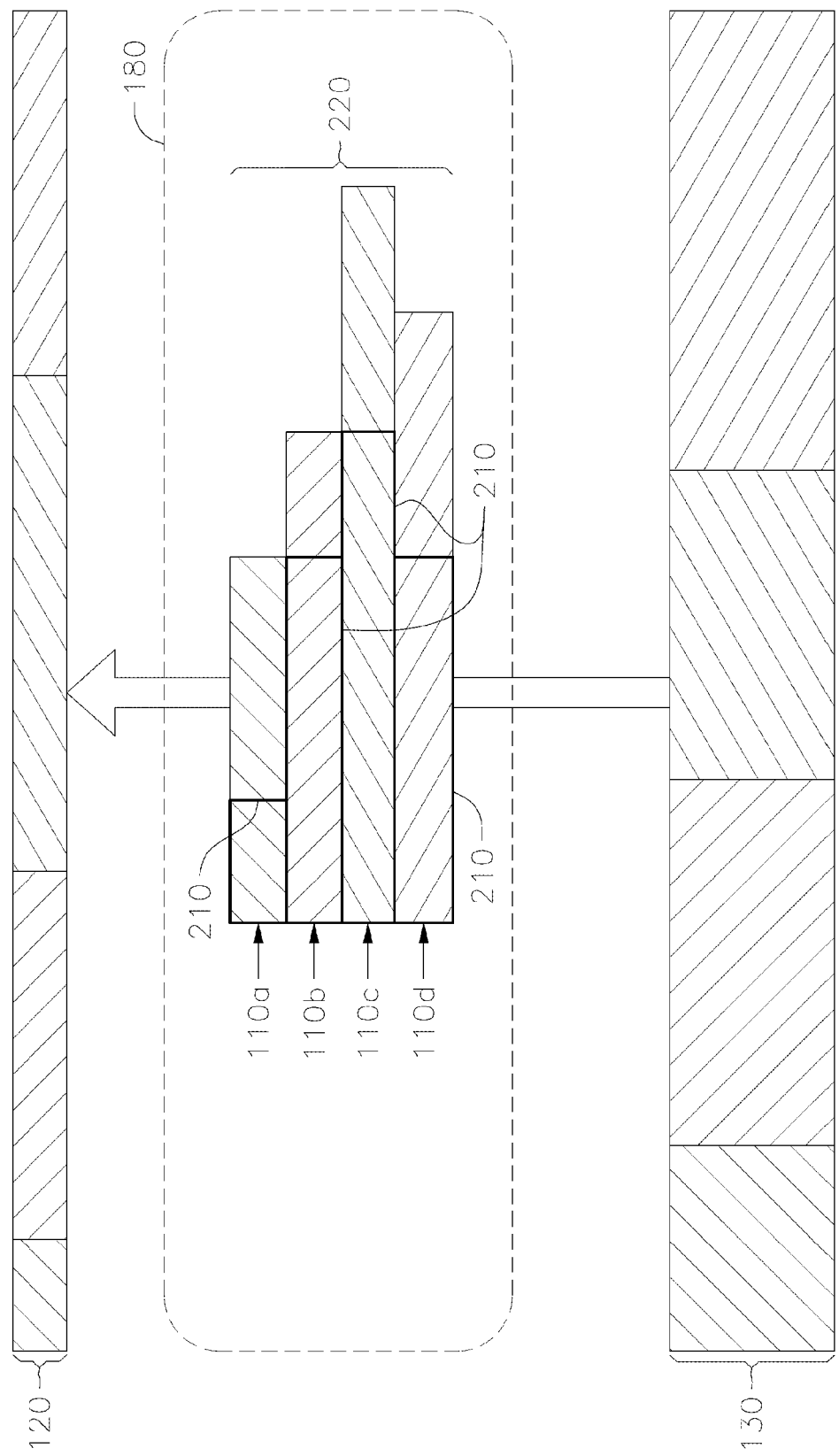
FIG. 2 is an example of an SSD-HDD update procedure performed by an ACRM, according to an embodiment of the present invention.

FIG. 2 is an example of an SSD-HDD update procedure performed by an ACRM, according to an embodiment of the present invention.

Referring to FIG. 2, the ACRM may update the contents of each of the VMs 110 inside the SSD 120 in a beginning of each epoch 220. In the present embodiment, a length of the epoch 220 varies according to a workload change corresponding to the VMs 110. Statistic information of the workload of all of the VMs 110 in a most recent epoch 220 is stored in the RAM 180, and the optimization framework of the ACRM is configured to decide a cache size "C," a prefetching granularity/prefetching size "b," and a frequency of a content update epoch sliding window "$S_c$" of each of the VMs 110 at a beginning of each workload monitor sliding window, which is discussed further below.

Based on the decided cache size "C," prefetching granularity "b," and epoch updating frequency "$S_c$," the ACRM is configured to update the SSD 120 by prefetching top blocks/hot bins 210 in the most recent epoch 220 to fill in the new size of the SSD 120 that is used as a cache. Because the ACRM only updates the SSD 120 and HDDs 130 in the beginning of each epoch 220, all missed IOs that occur during the epoch 220 will be directly bypassed to the HDDs 130 during runtime. Further, the ACRM may only adopt a write back policy for the SSD-HDD updating process in the beginning of each epoch 220.

Figure 3:
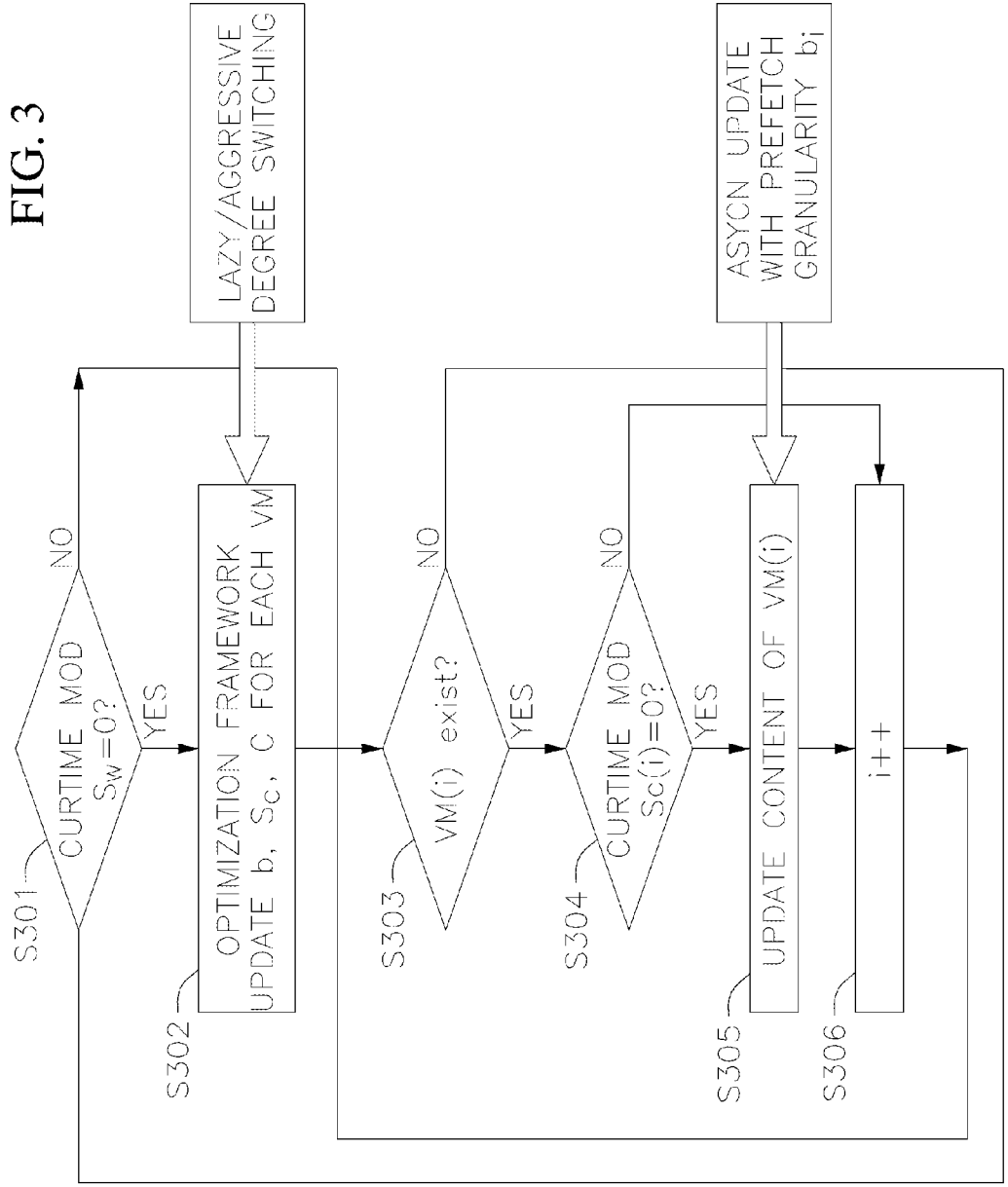
FIG. 3 is an example of a main workflow of an ACRM, according to an embodiment of the present invention.

FIG. 3 is an example of a main workflow of an ACRM, according to an embodiment of the present invention.

Referring to FIG. 3, in the main workflow of the ACRM of the present embodiment, there are two loops: an outer loop that periodically updates/adjusts (e.g., with a fixed frequency based on a workload monitor sliding window "$S_w$" of 20 minutes) prefetching granularity "b," cache size "C," and update frequency of the content update epoch sliding window "$S_c$" of each VM 110 corresponding to the temporal granularity; and an inner loop that updates the SSD 120 and HDDs 130 for each VM 110 with different allocation configurations decided by the outer loop. The prefetching granularity "b" refers to a spatial prefetching granularity (e.g., in bytes) of a workload (i.e., a size of data that is prefetched from HDDs 130 to SSD 120 for every SSD-HDD content updating epoch 220). Further, the cache size "C" refers to a total size of the cache (i.e., the SSD 120), and the update frequency of the content update epoch sliding window "$S_c$" corresponds to the temporal granularity.

At S301, the ACRM determines whether an end of the workload monitor sliding window "$S_w$" is reached. If it is, at S302, the ACRM may update the prefetching granularity "b," the cache size "C," and the update frequency of the content update epoch sliding window "$S_c$" for each VM 110 (e.g., to switch between lazy or aggressive modes). After updating, at S303, the ACRM determines whether a corresponding VM 110 exists, and if so, the ACRM determines at S304 whether an end of a sliding window, which corresponds to the update frequency of the content update epoch sliding window "$S_c$" of that VM 110, is reached. Once the end of the sliding window of the update frequency of the content update epoch sliding window "$S_c$" of the VM 110 is reached, the ACRM updates the content of the VM 110 at S305. After the content of the VM 110 is updated, a counter is incremented at S306 such that a subsequent VM 110 may be subsequently updated, and the process returns to S301.

Accordingly, two types of sliding windows used for each VM 110 running on the virtualized file system 100 are used by the ACRM. A first type of sliding window is the workload monitor sliding window "$S_w$." Each VM 110 has a workload monitor sliding window "$S_w$" of a fixed size (e.g., 20 min), which determines when to track IO behaviors of each VM 110, and also determines the SSD-HDD update frequency (i.e., the content update epoch).

A second type of sliding window is the content update epoch sliding window "$S_c$" mentioned above, which corresponds to the update frequency. Each VM 110 has a corresponding content update epoch sliding window "$S_c$," which is a sliding window for updating the SSD 120 based on the IO patterns of the recent epoch 220, which may also be referred to as the "temporal update granularity," the "update frequency," or the "update epoch." The ACRM can update each content update epoch sliding window "$S_c$" at the starting moment of the workload monitor sliding window "$S_w$," and can keep the same size within the workload monitor sliding window "$S_w$." Moreover, at a starting moment of the workload monitor sliding window "$S_w$," the ACRM can run the optimization framework to change the cache size "C," the temporal update granularity "$S_c$," and the spatial update granularity "b" of each VM 110.

To briefly summarize, the ACRM is configured to dynamically adjust the spatial granularities, which correspond to the prefetching granularity "b" and the cache size "C," and to dynamically adjust the temporal granularities, which correspond to a size of the workload monitor sliding window "$S_w$" and to a size of the content update epoch sliding window "$S_c$." For example, as in S301 of FIG. 3, the ACRM can determine when an end of the workload monitor sliding window "$S_w$" is reached and when the end of a VM list is reached, and may thereafter check a cumulative distribution function (CDF), which is described further below, and may update the content update epoch sliding window "$S_c$" based thereon.

Figure 4:
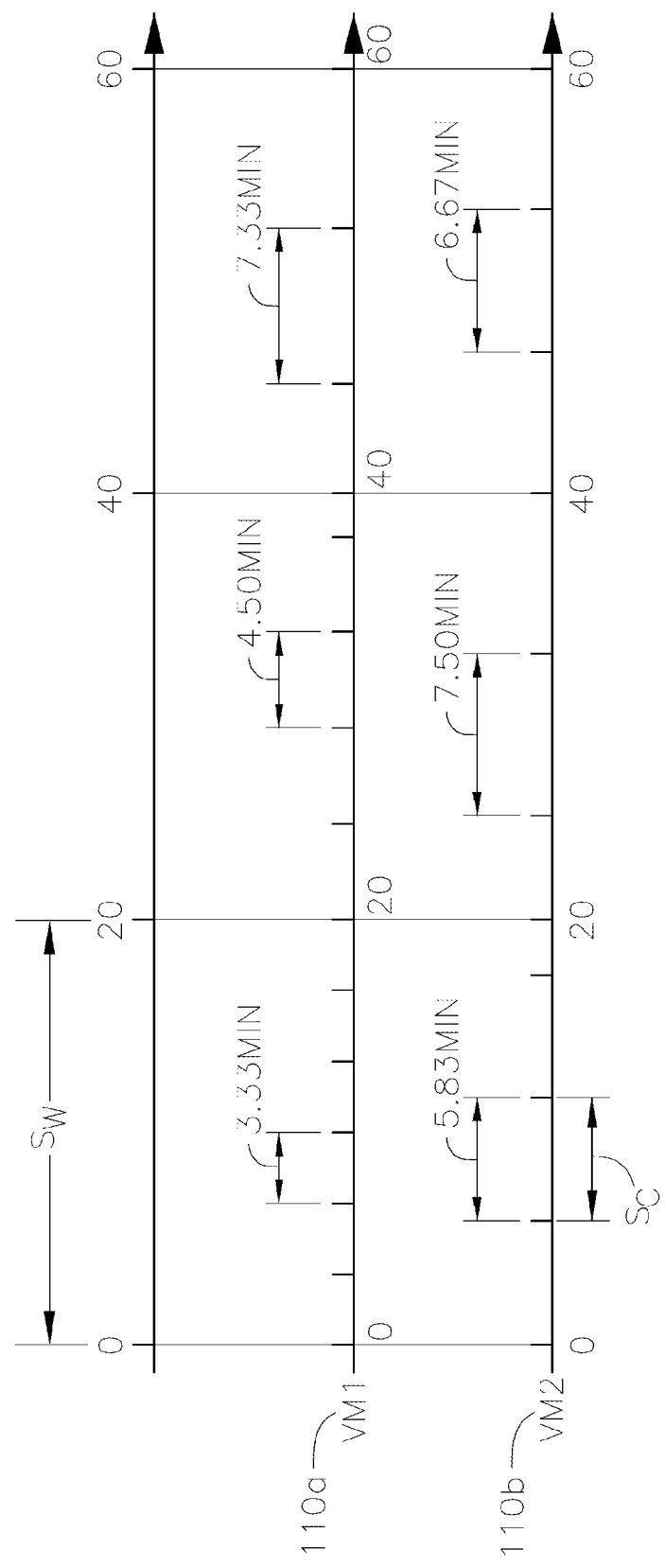
FIG. 4 depicts a comparison between a workload monitor sliding window "$S_w$" and a content update epoch sliding window "$S_c$" for a given timeline, according to an embodiment of the present invention.

FIG. 4 depicts a comparison between a workload monitor sliding window "$S_w$" and a content update epoch sliding window "$S_c$" for a given timeline, according to an embodiment of the present invention.

Referring to FIG. 4, two VMs 110 (i.e., first VM 110a and second VM 110b) are provided for the present example. Initially, the content update epoch sliding window "$S_{c1}$" corresponding to the first VM 110a corresponds to an update frequency of once every 3.33 minutes, while the content update epoch sliding window "$S_{c2}$" corresponding to the second VM 110b corresponds to an update frequency of once every 5.83 minutes. At the 20-minute mark (i.e., at the end of the workload monitor sliding window "$S_w$" corresponding to the VMs 110a and 110b, as described above with respect to S301 of FIG. 3), the ACRM updates the content update epoch sliding windows "$S_{c1}$" and "$S_{c2}$" such that the corresponding sizes of the epochs 220 corresponding to the VMs 110a and 110b are 4.50 minutes and 7.50 minutes, respectively.

In the present example, the size of the content update epoch sliding windows "$S_c$" is changed at the moment of the ACRM update. For instance, even though the second VM 110b is still in its fourth epoch at the 20-minute mark, the size of the fourth epoch (i.e., a final epoch before the 20-minute mark) is extended from 5.83 minutes to 7.50 minutes at the instant of the ACRM update (i.e., there need be no correlation between the workload monitor sliding window "$S_w$" and the content update epoch sliding window "$S_c$").

In the present embodiment, the workload monitor sliding window "$S_w$" is fixed during runtime at 20 minutes, while the content update epoch sliding window "$S_c$" is adjusted for each VM 110 at the end of each workload monitor sliding window "$S_w$." In detail, during each workload monitor sliding window "$S_w$" the ACRM bookkeeps accessed IOs, which may be aligned into 1 MB "workload statistical bins" for each VM 110. The ACRM may thereafter build the cumulative distribution function (CDF) of the percentage of the IO bins that correspond to a re-access time that is less than a reference time.

At the end of a workload monitor sliding window "$S_w$," the ACRM may determine the temporal update granularity based on the majority of IOs via a comparison with a preset threshold. In the present embodiment, workload statistical bins of size "$b_w$," may be used for statistical analysis only, and may not correspond to the "cacheline" and "prefetching sizes" mentioned later. In addition, the workload statistical bin size "$b_w$" may be set to, for example, 1 MB, although the workload statistical bin size "$b_w$" may be set to be the same size as the prefetching size "b," although bookkeeping overhead may increase as a result.

Accordingly, the ACRM may switch between a lazy mode (i.e., less frequent updating) and an aggressive mode (i.e., more frequent updating) to match the update (prefetch) frequency with recent hot data's reaccess lifetime, and to absorb as many hot bins as possible into the SSD 120 used as cache of the virtualized file system 100.

Figure 5:
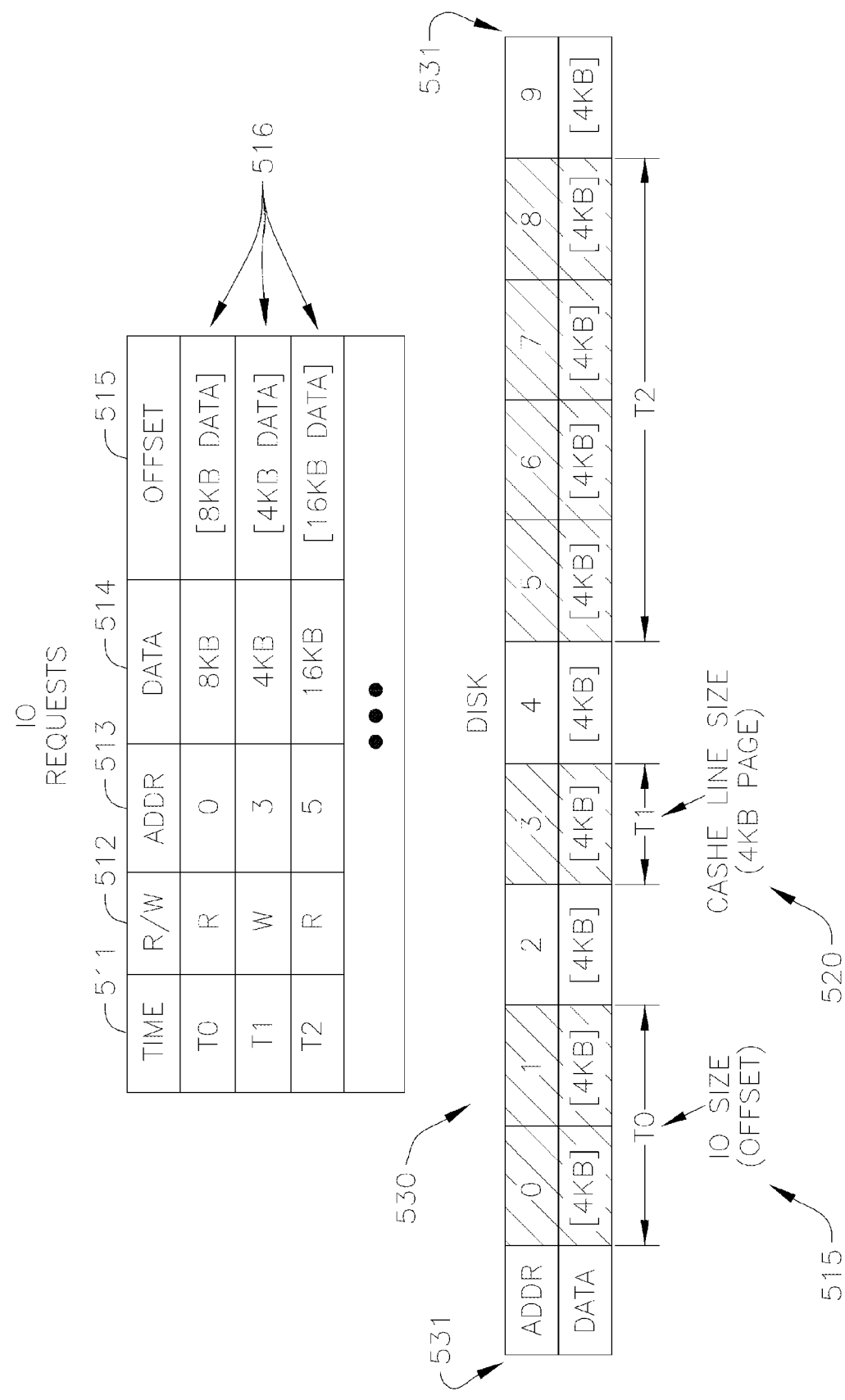
FIG. 5 is an example depicting IO request size and cache line size.
Figure 6:
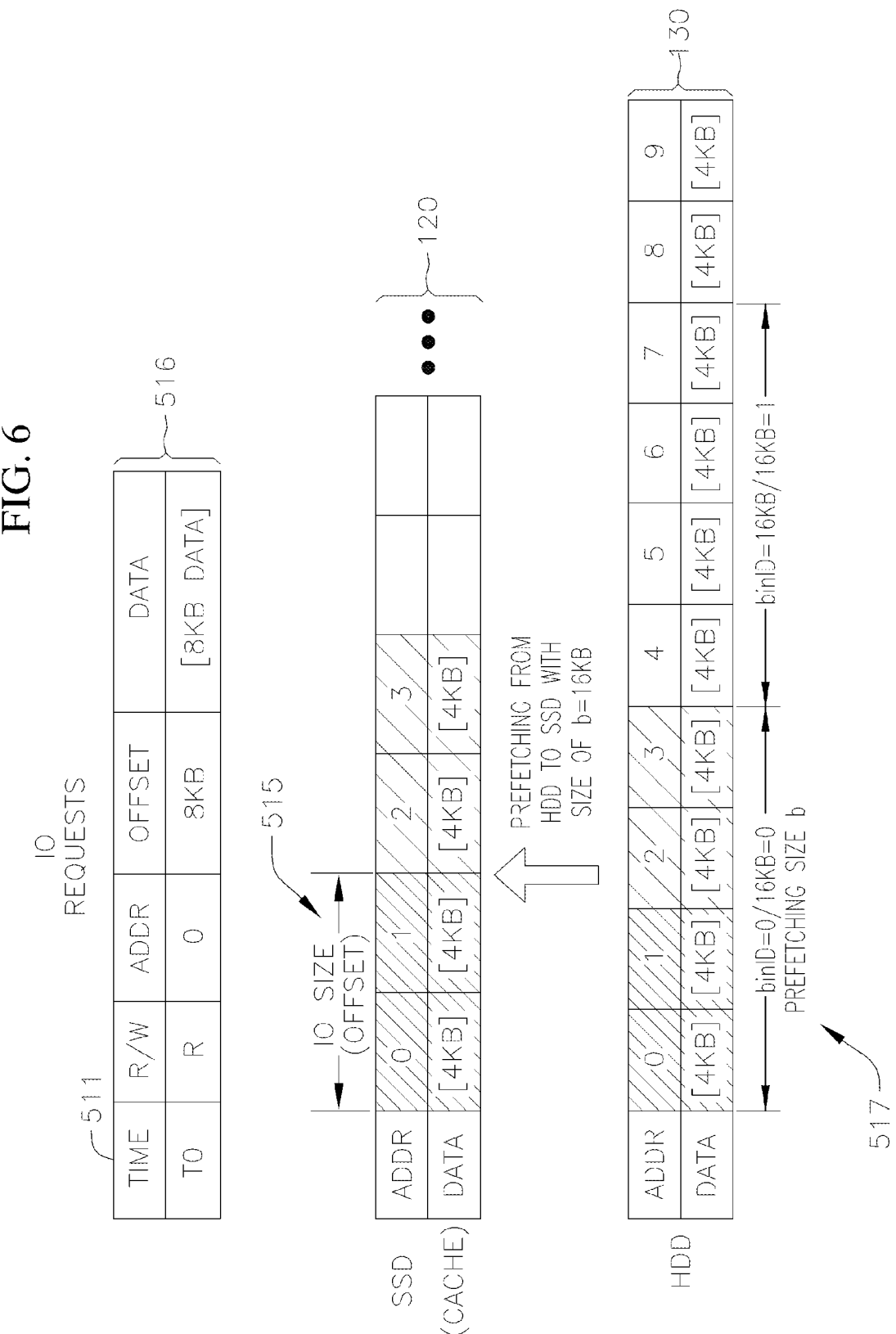
FIG. 6 is an example depicting prefetching granularity.

FIG. 5 is an example depicting IO request size and cache line size, and FIG. 6 is an example depicting prefetching granularity.

Referring to FIGS. 5 and 6, the ACRM considers four concepts corresponding to spatial granularity: IO request size (offset) 515; cache line size 520; statistical IO size/workload statistical bin size "$b_w$;" and prefetching size "b."

With respect to the IO request size 515, IO requests 516 can be described by an IO time/arrival time 511, a read/write flag 512 indicating whether the IO request corresponds to a read function or a write function, a start address (i.e., a logical address) 513, offset 515 indicating the size of the IO request, and the data of the IO 514. The IO address coverage of each IO request 516 (i.e., the addresses 531 on the disk 530 that are covered due to the IO) is from a point corresponding to the start address/logical address 513 to a point corresponding to the start address/logical address 513 plus the offset 515.

With respect to the cache line size 520, the start address/logical address 513 of IO requests 516 will be translated into a physical address (e.g., through an FTL mapping table of the SSD 120). The cache line size 520 corresponds to a granularity of a caching alignment, which corresponds to a smallest unit of IO operation (e.g., 4 KB in the present example). For example, an IO request size 515 of 8 KB will be treated as two 4 KB units, and if the IO request size 515 is not an integer multiple of the cache line size 520, the ACRM may round the IO request up to a nearest 4 KB page.

The statistical IO size, or workload statistical bin size "$b_w$" (e.g., 1 MB for each VM 110 in the present example) provides IO access information (e.g., working set size, popularities, etc.) for the optimization framework for each workload monitor sliding window "$S_w$" (e.g., 20 minutes). The workload statistical bin size "$b_w$" can also be implemented as a non-fixed value.

Referring to FIG. 6, with respect to the prefetching size/prefetching bin size "b" 517, to increase the IO hit ratio, instead of prefetching only the block of data that corresponds to the IO request 516, the ACRM may prefetch a batch of continuous data pieces. 1 MB is a good choice for b for MSR Cambridge Traces. ACRM can adaptively adjust the size of b according to the workload change.

For example, at time T0, only 8 KB of data are requested by a first IO request 516. However, because the prefetching size "b" 517 is 16 KB, 16 KB of data are prefeteched into the SSD 120 from the HDDs 130, such that when a following IO request 516 is located in the address range of 0 KB to 16 KB (i.e., start address/logical address 513 0, 1, 2, or 3 in the present example), then the ACRM need not go through the time-consuming lookup process in the HDDs 130, thereby improving the IO hit ratio.

Additionally, the ACRM may dynamically tune the prefetching size "b" 517 according to the workload change without changing the sizes of any other spatial granularities. The ACRM may use a universal approach to connect the prefetching size "b" 517 to the cache size "C" for each VM 110, and to determine an optimized share-VM flash resource allocation. To evaluate the efficiency of caching (e.g., using the SSD 120), the ACRM may use a metric to compare the cache hit contribution and the corresponding cost. The metric used by the ACRM may also reflect feedback corresponding to workload changes (e.g., spikes) of the VMs 110, and corresponding to different cache sizes "C." That is, the ACRM can analyze cache hit amount per cache cost for each VM 110 (e.g., the ACRM may calculate the "cache hit amount per cache cost" as the cache hit IO amount divided by a product of the cache spatial cost and the cache temporal cost).

Accordingly, for each byte of cache hit, the ACRM may evaluate a total spatial cost (prefetching IO cost) and temporal cost (prefetching IO time consumption). Because of the existence of multiple VMs 110, by finding higher hit amounts with lower costs with different settings according to the workload pattern of each VM 110, the ACRM can determine a global solution.

Figure 7:
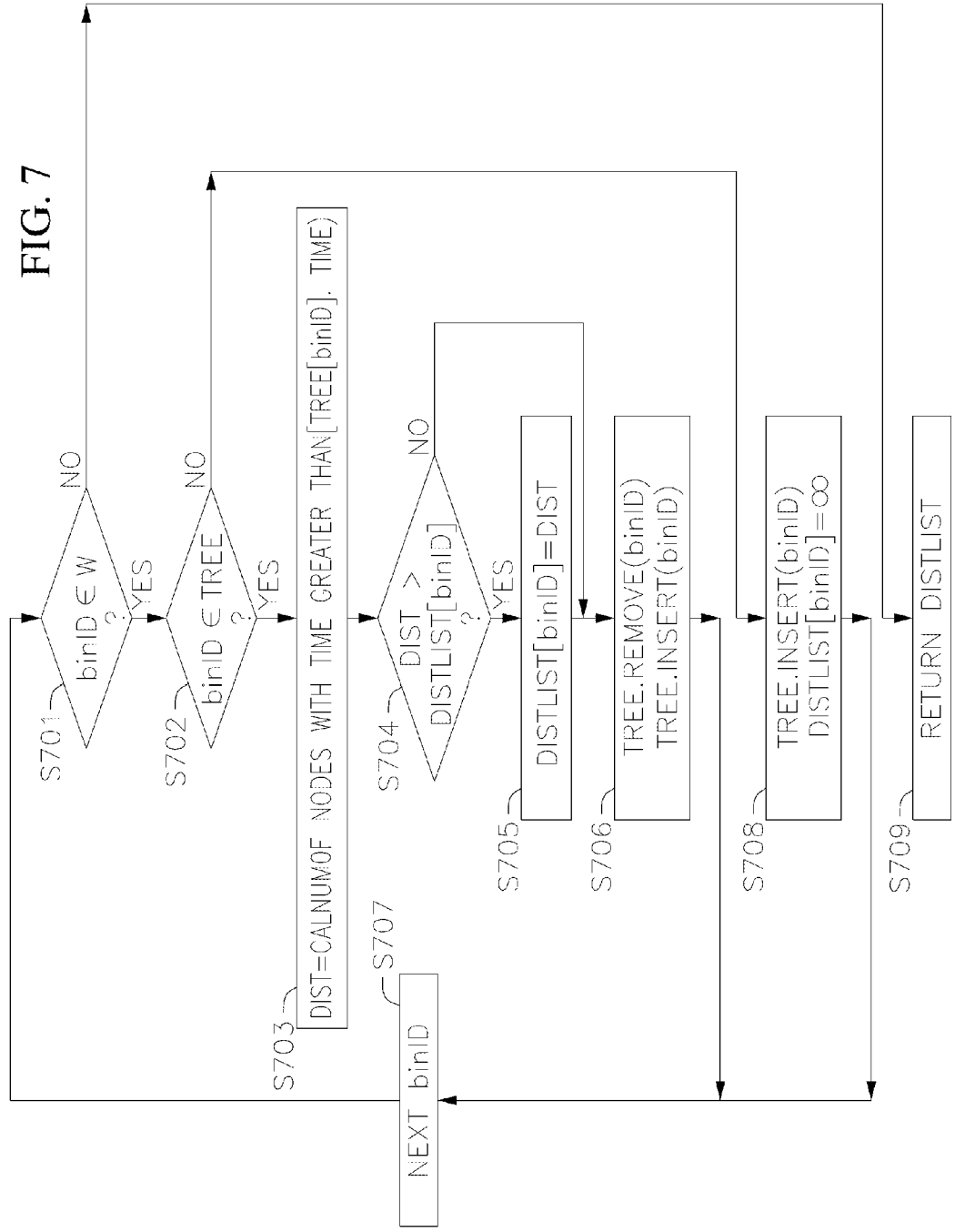
FIG. 7 depicts a workflow of an update tree, according to an embodiment of the present invention.
Figure 8:
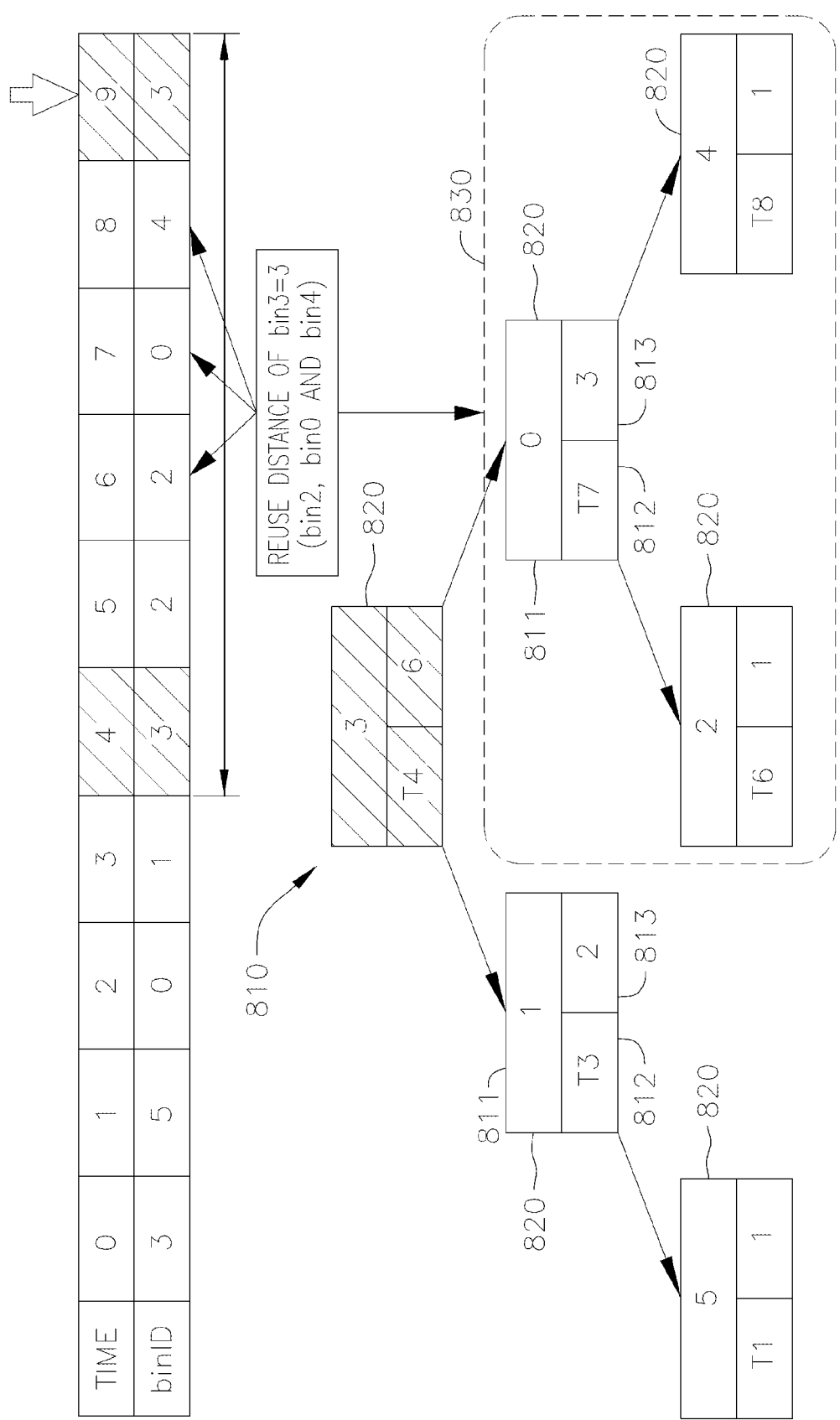
FIG. 8 depicts an example of a reuse distance of bins, according to an embodiment of the present invention.

FIG. 7 depicts a workflow of an update tree, according to an embodiment of the present invention, and FIG. 8 depicts an example of a reuse distance of bins, according to an embodiment of the present invention.

Although it may be difficult to estimate an exact IO hit amount for a given workload pattern under a given cache size "C," the ACRM can calculate the hit amount as the total IO amount during a recent epoch 220 multiplied by the estimated IO hit ratio. The upper bound of the IO hit ratio can be estimated by using the CDF function based on IO reuse distance, and the ACRM may maintain a max-reuse distance tree and a CDF function for each VM 110.

Referring to FIG. 8, for each workload monitor sliding window "$S_w$," the ACRM may maintain a max-reuse distance tree 810 for each VM 110. As shown in FIG. 8, a node 820 of the max-reuse distance tree includes binID 811, time 812, and weight 813. The binID 811 is the ID of the statistical bin (e.g., with a workload statistical bin size "$b_w$" of 1 MB) that is accessed as a result of the IO requests 516. The time 812 corresponds to the IO time/arrival time 511, and the weight 813 corresponds to the size of a subtree 830 of the max-reuse distance tree 810 (i.e., a total number of nodes of the subtree 830 including the node itself). In the present example, the binID 811 that is equal to 3 corresponds to a first node in the max-reuse distance tree 810 with a time 812 that is equal to 0, and a weight 813 that is equal to 1.

Referring to FIG. 7, at S701, the ACRM may determine whether the binID 811 is within a sampled workload "w". If not, the ACRM may return the distList at S709, but if so, the ACRM may determine at S702 whether the binID is within the max-reuse distance tree 810. If it is determined at S702 that the binID 811 is not within the max-reuse distance tree, the process may proceed to S708, at which point the ACRM may insert the binID 811 as a new node 820, and may update the max-reuse distance to be set to infinite. Thereafter, the ACRM may proceed to a subsequent binID 811 at S707 to restart the process. However, if it is determined at S702 that the binID 811 is within the max-reuse distance tree 810, then the ACRM may calculate a distance based on a number of nodes within the max-reuse distance tree 810 at S703. Thereafter, at S704, the ACRM may determine whether the calculated distance is greater than the distance corresponding to the binID 811 indicated in the distList. If so, the ACRM updates the distList at S705 and proceeds to S706, but if not, the ACRM skips to S706. At S706, the ACRM may update the tree (e.g., using an "updateTree" function), and may then proceed to a subsequent binID 811 at S707 to restart the process.

Referring to FIG. 8, when inserting a new node 820, the ACRM first searches the max-reuse distance tree 810 for its binID 811, and if the corresponding binID 811 is not found in the max-reuse distance tree 810 (e.g., at S702), then the ACRM may directly insert the binID 811 as a new node 820, and may update the max-reuse distance corresponding to the binID 811 as infinite (e.g., at S708). However, if the ACRM finds the binID 811 in the max-reuse distance tree 810 (e.g., at S702), then the ACRM may first update the max-reuse distance corresponding to the binID 811 as the number of nodes 820 in the max-reuse distance tree 810 that corresponds to a time 812 that is greater than the time 812 corresponding to the found binID 811 (e.g., at S703). Furthermore, the ACRM may use weight 813 to speed up the calculation of the max-reuse distance. After the calculation, the ACRM may delete the old node 820, and may insert the new IO bin as a new node 820. Accordingly, the ACRM may use an approximation tree to simplify the max-reuse distance tree 810, and to reduce overhead.

Based on the "distList" returned from an "updateTree" function (e.g., at S706 and S707), the ACRM further builds the CDF function of max-reuse distance and percentage of bins. The ACRM can iterate different cache sizes/max-reuse distances "C" to check the upper bound of the hit ratio that is able to be achieved for this period of workload. Accordingly, only when the cache size "C" is larger than the max-reuse distance is a cache hit is possible. Therefore, the ACRM builds the connection between the cache size "C" and the theoretical best result of a least recently used (LRU) caching algorithm hit ratio. Because the theoretical best result of the LRU caching algorithm hit ratio is the upper bound, the real cache hit ratio can only be less than or equal to it.

To calculate spatial cost, the ACRM first estimates a number of prefetching operations of a workload "$W_i$," corresponding to a given virtual machine "VM," with a prefetching size of "$b_i$" within the epoch sliding window "$S_c$." The ACRM defines the number of prefetching operations as a function of the workload "W" and the spatial prefetching granularity "$b_i$" of the workload "$W_i$" (e.g., $P(W_i, b_i)$, which may be referred to as an estimation function of the number of prefetching operations of the workload "W,").

Estimation of the number of prefetching operations may be performed as follows. For each epoch sliding window "$S_c$," the ACRM checks each IO by dividing it by the cache line size 520 (e.g., 4 KB), with the result of IO page "x." IO page "x" may correspond to the start address/logical address 513. If it is not found (e.g., found in a "pseudoPrefectchBinList"), then a pseudo-prefetching operation by the ACRM will be triggered, which marks a [x/b]th prefetching bin (e.g., into the pseudoPrefectchBinList, which contains page in range of [[x/c],[x/c]+b]). Any new IO requests that are in the range of x to (x+b) will be considered as a cache hit, and will not need to be prefetched again. This estimation, however, has an error due to the assumption is that an unlimited size of cache is used for prefetching. In other words, the real number of prefetching operations "P" will be greater than the estimated number determined from the function $P(W_i, b_i)$.

Based on the function $P(W_i, b_i)$, the ACRM can calculate the prefetching spatial cost as the total amount of data for loading from the HDDs 130 to the SSD 120 (i.e., $P(W_i, b_i) \times b_i$). It should be noted that this function is a theoretical lower bound, and the real cost may therefore be higher. Accordingly, the ACRM considers both different prefetching granularities "b" and workload changes.

To evaluate the temporal cost, the ACRM multiplies the number of prefetching operations "P" by a time cost of a single prefetching operation (i.e., a time cost associated with reading an amount of data having a size "b" from the HDDs 130, and writing the data to the SSD 120). That is, the ACRM may evaluate the temporal cost as $P(W_i, b_i) \times T(b_i)$, where $T(b_i)$ is a pre-measured value of a single prefetching operating cost. Greater prefetching granularity will correspond to a larger $T(b_i)$, but less $P(W_i, b_i)$.

It should be noted that the mode of the ACRM, whether lazy or aggressive, has different meanings in temporal and spatial domains. For example, the lazy spatial update mode means the update prefetching size "b" is small, while the lazy temporal update mode means the content update epoch sliding window "$S_c$" is large, which corresponds to less frequent updating. Based on the aforementioned equations, the ACRM approaches space allocation and adjusts prefetching size as a constrained optimization problem. The ACRM optimization framework explores different permutations of per-VMDK space allocation values, calculates the "cache hit amount per cache cost" as the objective function, and returns the permutation with the global maximum in the search space. More specifically, the ACRM adopts the following optimization framework.

The ACRM seeks to maximize a global function as $$G(W, C, b) = \sum_{i=0}^{N_w} \frac{H(C_i, b_i)}{[P(W_i, b_i)]^2 \times b_i \times T(b_i)},$$

while the ACRM seeks to satisfy $$\sum_{i=0}^{N_w} C_i = C;$$

-continued $$C_{min} \leq C_i \leq C_{max}; \text{ and}$$

$$b_{min} \leq b_i \leq b_{max}$$

wherein $T(b_i)$ corresponds to a time cost of one prefetching operation with the granularity of $b_i$, which may be directly measured or may be estimated as a total amount of time for reading data with $b_i$ size from the HDDs 130 and writing the data to the SSD120, wherein "$C_{min}$" and "$C_{max}$" correspond to the lower and upper bounds of the cache size "C" per VM 110, respectively, and wherein "$b_{min}$" and "$b_{max}$" correspond to the lower and upper bounds of the spatial prefetching granularity, respectively.

Accordingly, G(W,C,b) is a global version of the aforementioned equation corresponding to the prefetching bin size "b." In the implementation of solving these equations, the ACRM may also adopt heuristics algorithms, such as simulated annealing and hill climbing.

The ACRM is also able to conduct a process of updating bins for each epoch sliding window "$S_c$." During each epoch sliding window "$S_c$," the ACRM maintains a record of bin access popularity for each VM 110. For example, the ACRM may maintain a record (e.g., a record referred to as "curAccBins"), which is list of candidate hot bins (e.g., prefetching bins having a size of $b_i$) to be added to the SSD cache 120.

In general, there may be two cases during the updating process. In a first case, the cache size "C" for the next content update epoch sliding window "$S_c$" is less than or equal to the size of the record (e.g., the record of "curAccBins"). The ACRM may select a top cache size "$C_i$" of bins from the record, and may add them to the SSD 120. Existing bins (which may be referred to as "oldBinsInSSD") may be written back to the HDDs 130 if a "dirty flag" is marked as true, thereby indicating that the version of the SSD cache 120 version is more recent than the version of the HDD 130).

In a second case, the cache size "C" for the next content update epoch sliding window "$S_c$" is greater than the size of the record (e.g., the size of "curAccBins"). In this case, the ACRM first loads all bins from "curAccBins" to the SSD 120, and attempts to fill the remaining space of cache of the SSD 120 (i.e., with the size of $C_i$-len(curAccBins)) with top bins of the existing bins "oldBinsInSSD" of the VM 110 in the SSD 120 in the last epoch 220. If the ACRM determines that space remains in the SSD 120 (i.e., when $C_i$-len (curAccBins)-len(oldBinsInSSD)+len(dup(curAccBins,oldBinsInSSD))>0), then the ACRM will fill the SSD 120 with paddingBins, which may be from long-term IO access history or from the 20 minute history of the workload monitor sliding window "$S_w$." Similarly, the ACRM may remove data from the SSD 120 by checking a victim data's "dirty flag."

Although the ACRM may treat the tier of the SSD 120 as a "unibody" cache tier (i.e., treat a tier of one or more SSDs 120 as a single SSD, and may treat a tier of the one or more HDDs 130 as a single HDD). That is, the ACRM may have multiple disks in each of the SSD tier and the HDD tier), and the ACRM may adopt both RAID and non-RAID mode disk arrays in each tier.

Figure 9:
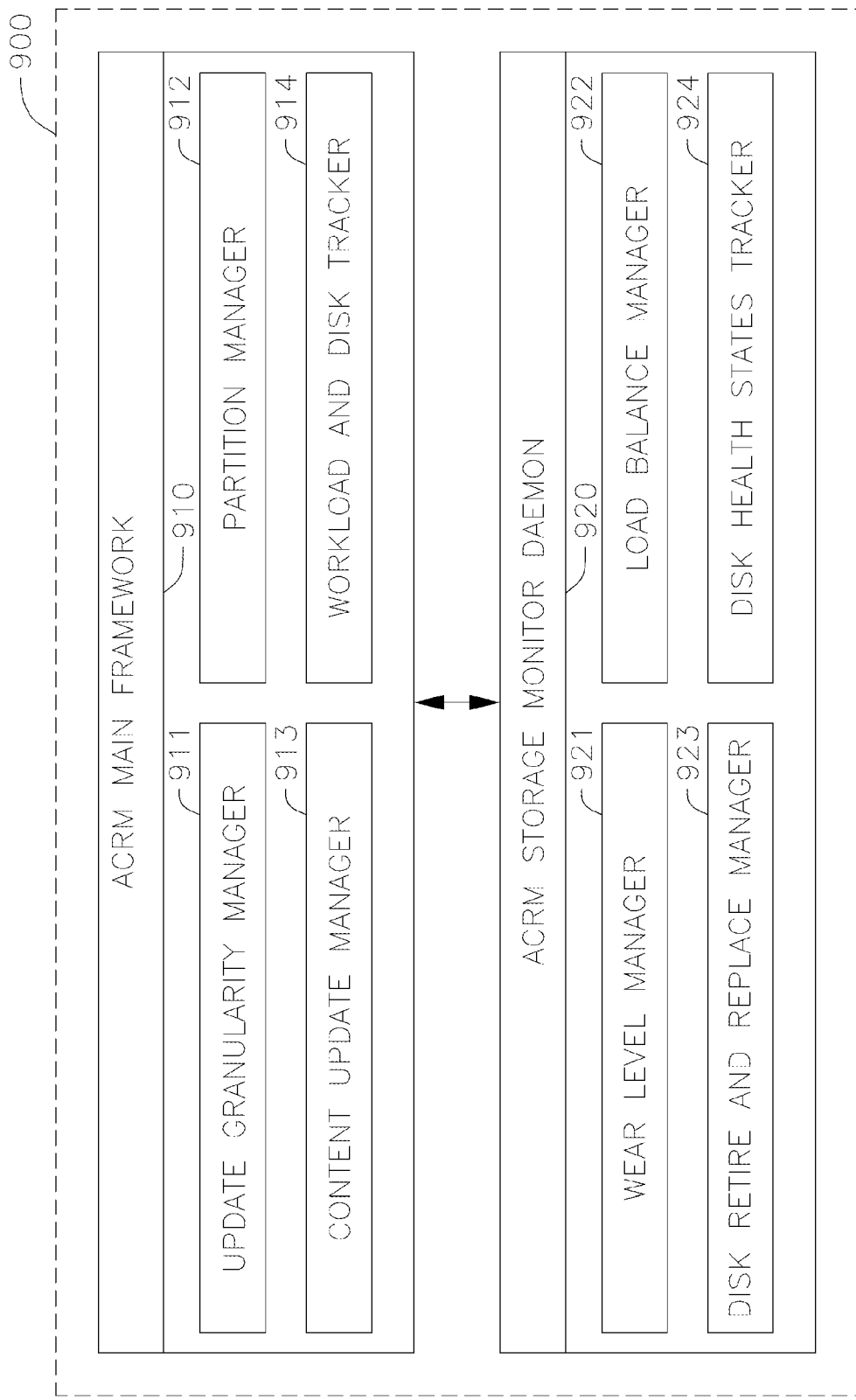
FIG. 9 is a block diagram of an ACRM including an ACRM main framework and an ACRM storage monitor daemon, according to an embodiment of the present invention.

FIG. 9 is a block diagram of an ACRM including an ACRM main framework and an ACRM storage monitor daemon, according to an embodiment of the present invention.

Referring to FIG. 9, in the present embodiment, the ACRM 900 has an additional component that may be referred to as a "storage monitor daemon" 920 for conducting the following operations: periodically tracking disk information (e.g., spatial capacity, throughput capacity, life cycle, worn-out degree, etc.); retiring and replacing disks that are reaching preset performance lower bounds (e.g., heavily worn-out or otherwise defective disks); balancing the workload among disks; and triggering SSD-level wear leveling to balance write cycles or P/E cycles. Accordingly, the storage monitor daemon 920 may have a wear level manager 921, a load balance manager 922, a disk retire and replace manager 923, and a disk health states tracker 924.

During operation of the wear level manager 921, the ACRM 900 may use the second optimization framework to conduct wear leveling with minimized migration cost, and to balance workload among disks.

FIG. 10 depicts a comparison of content update and wear leveling processes using both an ACRM that is storage monitor daemon-enabled and an ACRM that has no storage monitor daemon, according to embodiments of the present invention.

Referring to FIG. 10 an upper portion (e.g., FIG. 10(a)) depicts an example of a partition solution for a next epoch 220 according to the aforementioned ACRM optimization frame work. However, instead of a single SSD 120, as depicted in FIG. 1, there are four SSD disks 120a, 120b, 120c, and 120d in the SSD tier. FIG. 10(b) shows an allocation solution by an ACRM that has no storage monitor daemon, and therefore does not consider program/erase (P/E) cycle and life time of each disk. FIG. 10(c), however, depicts an example of a partition solution using the storage monitor daemon (e.g., the storage monitor daemon of FIG. 9) to perform SSD-level wear leveling. The ACRM may attempt to balance the P/E cycles of each of the SSDs 120a-120d. Because the SSDs 120 in the SSD tier can be either homogenous or heterogonous, the ACRM may use the remaining P/E cycles as the main target to balance. Instead of straightforwardly assigning partitions of each of the VM 110a-110d for the next epoch based on information of one or more recent epochs (as performed by the ACRM shown in FIG. 10(b)), the storage monitor daemon 920 of the ACRM may further split each of one or more of the VMs 110a-110d into more fine-grained sub-partitions, and may assign the sub-partitions across the SSDs 120a-120d of the SSD array to balance a worn-out degree (P/E cycles).

In each of 10(b) and 10(c), VMs 110a-110d are partitioned, and assigned to corresponding regions of SSDs 120a-120d. In 10(b), the VMs 110a-110d are straightforwardly partitioned (i.e., simply placed in the SSDs 120a-120d in order, from beginning to end). In 10(c), the ACRM also considers the wear level in determining where to partition the VMs 110a-110d, and also uses another optimization framework to allocate the partitions to each VM. Accordingly, in FIG. 10(b), the partition corresponding to the second VM 110b occupies the first and second SSDs 120a and 120b. However, it may be that this is a suboptimal optimization (e.g., maybe second VM 110b corresponds to a lot of write IOs, or maybe the second SSD 120b is relatively old/worn). Accordingly, in 10(c), the majority of second VM 110b is partition into the first SSD 120a, while a smaller portion of the second VM 110b is partitioned into the second SSD 120b, thereby enabling balancing/leveling across bits. Accordingly, by using an objective function to decide an improved or optimal partitioning scheme, the ACRM considers multiple parameters (e.g., wear leveling, partitioning, remaining life cycle, estimated/expected life cycle balance, etc.)

It should be noted, however, that simply balancing the remaining P/E cycle may be insufficient, because the ACRM may also consider characteristics of the different SSDs 120a-120d (e.g., different write amplification functions (WAF) and total P/E cycles), and may also consider cost associated with migrating some datasets for wear leveling, as well as throughput utilizations. The ACRM may use the following optimization framework to address balancing between these parameters The ACRM may minimize the following global equation $$\alpha \cdot CV(E(Cl_{rem})) + \beta \cdot Cst(Mig) + \gamma \cdot CV(ThuptUtil)$$

While seeking to satisfy the following equations $$CV(E(Cl_{rem})) = \frac{\sqrt{\frac{1}{N_D}\sum_{i\in[1,N_D]}[E(Cl_{rem}[i]) - \overline{E(Cl_{rem})}]^2}}{\overline{E(Cl_{rem})}}$$

$$E(Cl_{rem}[i]) = Cl_{rem}[i] - Cl_{next}[i]$$

$$Cl_{next}[i] = W[i] \cdot WAF_i[i] = W[i] \cdot f_i\left(\frac{\sum_{j\in D[i]}(W[ij] \cdot Seq[ij])}{\sum_{j\in D[i]} W[ij]}\right)$$

$$\sum_{\substack{j\in D[i] \\ i\in[1,N_D]}} W[ij] = W[j]$$

$$i \in [1, N_D]$$

$$j \in [1, N_{WL}]$$

In detail, by seeking to reduce or minimize the objective function, the ACRM aims to reduce or minimize the load unbalance of estimated remaining P/E cycles of each of the SSDs 120a-120d, and also aims to reduce or minimize the corresponding migration cost, as well as the throughput utilization. As above, α, β, and γ are tunable parameters for datacenter managers to perform adjustments based on system requirements. "CV" may be referred to as a coefficient of variation, which reflects the difference degree of a batch of the input. Here, the ACRM may use the estimated remaining P/E cycle of each disk (i.e., $E(Cl_{rem})$) under an iterated allocation and partition plan in the value range. $E(Cl_{rem}[i])$ is the estimated remaining P/E cycle of disk i, and $\overline{E(Cl_{rem})}$ is the average value of the estimated remaining P/E cycles of all of the disks. That is, lowering the objective function realized by the above global equation achieves greater balance. Furthermore, the global equation may allow the adjusting of the α, β, and γ parameters to control weight. Although the global equation described above is linear, in other embodiments, the global equation may be more complicated (e.g., a logarithmic equation, etc.).

Accordingly, by monitoring/measuring different aspects associated with IO operations, the ACRM is able to determine what behaviors result in what types of physical effects, the ACRM may achieve a finer resolution feedback.

As shown above, the ACRM may calculate $E(Cl_{rem}[i])$ by subtracting the estimated physical write P/E cycles during the predicted next epoch (of all VMs 110 assigned to disk "i") from the remaining P/E cycle of disk "i."

Additionally, the ACRM may estimate the $Cl_{next}[i]$, noting that the physical write amount of the disk during a next epoch can be calculated by multiplying a total amount logical write of disk "i" during a next epoch (W[i]) with the WAF function of disk "i" ($WAF_i$). Furthermore, the WAF function is a piecewise function ($f_i$) of overall sequential ratios of all write streams to the disk $$\left( \text{e.g., } \frac{\sum_{j \in D[i]} (W[ij] \cdot Seq[ij])}{\sum_{j \in D[i]} W[ij]} \right).$$

The equations above demonstrate that an assigned partition of each VM can be split into different across-SSD sub-partitions.

According to the above, the ACRM of embodiments of the present invention is able to improve disk allocation in a virtualized file system by dynamically adjusting temporal and spatial granularities associated with IO requests by monitoring metrics associated with the workloads of various virtual machines, and by determining a global best solution for the temporal and spatial granularities in consideration of the workload patterns of the virtual machines.

What is claimed is:

1. A method of improving disk allocation in a virtualized file system by adjusting temporal and spatial granularities associated with operation of the virtualized file system, the method comprising:
analyzing past workloads of a plurality of virtual machines associated with the virtualized file system;
adjusting the temporal and spatial granularities to be similar to average re-access temporal and spatial distances of data sets stored in the virtualized file system and corresponding to the past workloads;
conducting load balancing, wear leveling, disk health monitoring, and disk retirement/replacement on an array of fast drives based on the past workloads of the virtual machines respectively corresponding to the array of fast drives;
separating the virtual machines into subsets based on respective wear levels of the fast drives predicted from the past workloads; and
assigning the subsets of the virtual machines across the fast drives of the array of fast drives to balance wear of the fast drives.

2. The method of claim 1, further comprising adjusting partition sizes inside a fast drive of the virtualized file system for each virtual machine disk of the virtual machines.

3. The method of claim 2, further comprising detecting IO changes of each virtual machine disk, and wherein adjusting partition sizes is based on the detected IO changes.

4. The method of claim 1, wherein adjusting the temporal and spatial granularities comprises adjusting a time interval of a workload monitor sliding window for updating content of a fast drive used as a cache of the virtualized file system.

5. The method of claim 4, wherein the analyzing past workloads of the plurality of virtual machines occurs at an end of the workload monitor sliding window.

6. The method of claim 1, wherein adjusting the temporal and spatial granularities comprises adjusting a prefetching bin size corresponding to an amount of data retrieved from a fast drive or a slow drive of the virtualized file system.

7. The method of claim 1, wherein adjusting the temporal and spatial granularities comprises adjusting a cache size or an epoch updating frequency of each of the virtual machines based on the past workloads.

8. The method of claim 1, further comprising updating a fast drive as a cache of the virtualized file system by prefetching data in a most recent epoch based on the adjusted temporal and spatial granularities.

9. A virtualized file system capable of improved disk allocation, the virtualized file system comprising:
a plurality of virtual machines;
one or more slow drives;
a fast drive as a cache for the one or more slow drives;
a memory; and
a processor coupled to the memory, the processor executing a software component that is configured to:
analyze past workloads of a plurality of virtual machines associated with the virtualized file system;
adjust temporal and spatial granularities to be similar to average re-access temporal and spatial distances of data sets stored in the virtualized file system and corresponding to the past workloads;
conduct load balancing, wear leveling, disk health monitoring, and disk retirement/replacement on an array of fast drives based on the past workloads of the virtual machines respectively corresponding to the array of fast drives;
separating the virtual machines into subsets based on respective wear levels of the fast drives predicted from the past workloads; and
assigning the subsets of the virtual machines across the fast drives of the array of fast drives to balance wear of the fast drives.

10. The virtualized file system of claim 9, wherein the software component is further configured to adjust partition sizes inside the fast drive for each virtual machine disk of the virtual machines.

11. The virtualized file system of claim 10, wherein the software component is further configured to detect IO changes of each virtual machine disk, and wherein the software component is configured to adjust the partition sizes based on detected IO changes.

12. The virtualized file system of claim 9, wherein the software component is configured to adjust the temporal and spatial granularities by adjusting a time interval of a workload monitor sliding window for updating content of a fast drive used as a cache of the virtualized file system.

13. The virtualized file system of claim 9, wherein the software component is configured to adjust the temporal and spatial granularities by adjusting a prefetching bin size corresponding to an amount of data retrieved from a fast drive or a slow drive of the virtualized file system.

14. The virtualized file system of claim 9, wherein the software component is configured to adjust the temporal and spatial granularities by adjusting a cache size or an epoch updating frequency of each of the virtual machines based on the past workloads.

15. The virtualized file system of claim 9, further comprising updating a fast drive as a cache of the virtualized file system by prefetching data in a most recent epoch based on the adjusted temporal and spatial granularities.

16. A method of improving disk allocation in a virtualized file system by adjusting temporal and spatial granularities associated with operation of the virtualized file system, the method comprising:
determining whether an end of a workload monitor sliding window corresponding to a plurality of virtual machines of the virtualized file system is reached;
updating one or more of a prefetching granularity, a cache size, and an update frequency of a content update epoch sliding window for each of the virtual machines;
determining whether an end of the content update epoch sliding window of a corresponding one of the virtual machines is reached;
updating content of the corresponding one of the virtual machines in response to a determination that the end of the content update epoch sliding window is reached;

conducting load balancing, wear leveling, disk health monitoring, and disk retirement/replacement on an array of fast drives based on past workloads of the virtual machines;

separating the virtual machines into subsets based on respective wear levels of the fast drives predicted from the past workloads; and assigning the subsets of the virtual machines across the fast drives of the array of fast drives to balance wear of the fast drives.

* * * * *